Figure 1:
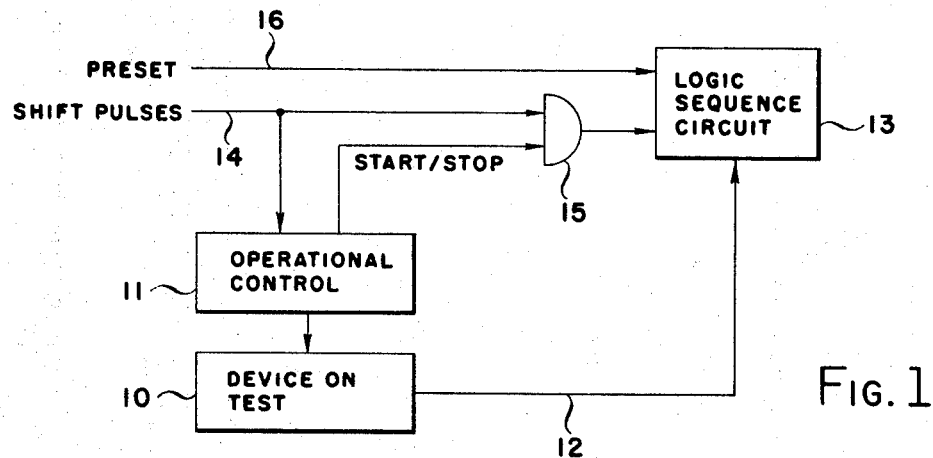

United States Patent

[11] 3,582,633

| [72] | Inventor | Robert E. Webb<br>Atlanta, Ga. |
|---|---|---|
| [21] | Appl. No. | 706,852 |
| [22] | Filed | Feb. 20, 1968 |
| [45] | Patented | June 1, 1971 |
| [73] | Assignee | Lockheed Aircraft Corporation<br>Burbank, Calif. |

[54] METHOD AND APPARATUS FOR FAULT DETECTION IN A LOGIC CIRCUIT
8 Claims, 2 Drawing Figs.

[52] U.S. Cl. .................................................. 235/153, 324/73
[51] Int. Cl. .................................................. G05b 1/01, G06f 11/04, G08b 23/00
[50] Field of Search .......................................... 235/153; 307/221; 340/146.1, 146.2; 324/73

[56] References Cited
UNITED STATES PATENTS

| 3,162,837 | 12/1964 | Meggitt | 340/146.1 |
| 3,418,630 | 12/1968 | Van Duuren | 340/146.1 |
| 3,508,195 | 4/1970 | Sellers | 340/146.1 |
| 3,469,186 | 9/1969 | Gowan | 324/73 |

OTHER REFERENCES

Quosig, R. A. Error Checkup Count-up or Count-down Counter. IBM Technical Disclosure Bulletin. (5) 7 December 1962

*Primary Examiner*—Malcolm A. Morrison
*Assistant Examiner*—R. Stephen Dildine, Jr.
*Attorneys*—Roger T. Frost and George C. Sullivan ABSTRACT: Performs an evaluation of a logic circuit by establishing a type of shift register having a sequence of shifting determined by the logic signals present at outputs of the circuit being evaluated. If the register is preset to a certain number and shifted at the consistent control of the outputs of a properly functioning circuit, the number remaining in the register at the end of the operating cycle is always the same, whatever that number may be. Inconsistent control of the shifting caused by the different logic output signals of a malfunctioning circuit produces a different number remaining in the register, indicating that the circuit has not functioned properly.

PATENTED JUN 1 1971  3,582,633

INVENTOR.
ROBERT E. WEBB
BY *George C Sullivan*
AGENT
*Roger T. Frost*
ATTORNEY

METHOD AND APPARATUS FOR FAULT DETECTION IN A LOGIC CIRCUIT

This invention relates in general to a fault detection method and apparatus and in particular to a method and apparatus for detecting faults in a circuit or a combination of circuits which function in a predetermined logical manner.

The problems of evaluating the performance of apparatus including electrical or electronic circuitry become increasingly complicated as the apparatus itself becomes more complex. The current trend toward relatively complex control apparatus particularly is found, for example, in the guidance and control apparatus found in the typical modern aircraft. Moreover, there is a particular need for a fault detection method and apparatus which can be applied to a circuit undergoing evaluation to give a "go-no go" indication for that particular circuit so that the presence or absence of a fault in the circuit can be determined initially by someone not necessarily having the relatively high degree of skill necessary actually to locate the fault and repair the circuit.

The fault detection apparatus heretofore generally available has required tailoring to the specific circuit or system to be tested. Thus, this type of test apparatus typically may include circuits which store or recognize pulse patterns to be expected from the outputs of a properly functioning apparatus being tested and a comparison apparatus which compares the pulse patterns actually produced by the apparatus being tested with the stored pulse patterns known to correspond to a proper state of operation. Any deviation of the actual circuit pulse patterns from the stored desired patterns indicates that the circuit has a malfunction which must be corrected.

While testing or fault evaluation circuits of the type thus described are effective, it is evident that such circuits must be designed and programmed especially for the particular apparatus to be tested and would have no utility as a test device for another circuit. Thus, each system, subsystem or other assemblage of circuits in an environment such as a particular aircraft must have its own unique testing apparatus whether built into the circuit or connectable thereto only for test purposes. Moreover, any modification of the circuits being tested generally requires a corresponding modification of the test apparatus itself to accommodate the different output signals produced by the modified circuit.

Accordingly, it is an object of this invention to provide an improved fault detection method and apparatus.

It is another object of this invention to provide an improved fault detection method and apparatus for a logic circuit.

It is a further object of this invention to provide a fault detection method and apparatus which can be used to evaluate a number of dissimilar logic circuits.

It is yet another object of this invention to provide a fault detection method and apparatus for evaluating the performance of a multiple output logic circuit without requiring specific knowledge of the operational nature of such outputs.

It is still a further object of this invention to provide a fault detection method and apparatus for evaluating the performance of a logic circuit without requiring a comparison between actual circuit operation and preprogrammed desired circuit operation.

In general the technique of the present invention includes the application of selected outputs of a circuit undergoing evaluation to a logic sequence device such as a pseudorandom sequence generator modified as described below. The circuit being evaluated then is excited or operated by a suitable source forming no part of the present invention to simulate one or more modes of operation, and the logical state of the logic sequence device is shifted in a manner uniquely dependent on the presence or absence of signals at the selected outputs of the circuit being evaluated and also dependent upon the operational nature of the logic sequence device. At the end of the operation of the circuit being evaluated, the logic sequence device, having initially been preset to a known logical state, now is at some final logical state which is readily determined. This final logical state is compared with an "ideal" final logical state, which may be the final logical state produced in a similar sequence of events by a similar circuit known to be functioning properly. Since a malfunction in the circuit being evaluated causes the signals present at the selected outputs of this circuit to differ from the signals normally present in a properly operating circuit, the final logical state of the logic sequence device can correspond to the predetermined ideal logical state only when the selected outputs of this circuit assume the proper values at the correct times for a properly functioning circuit.

Figure 2:
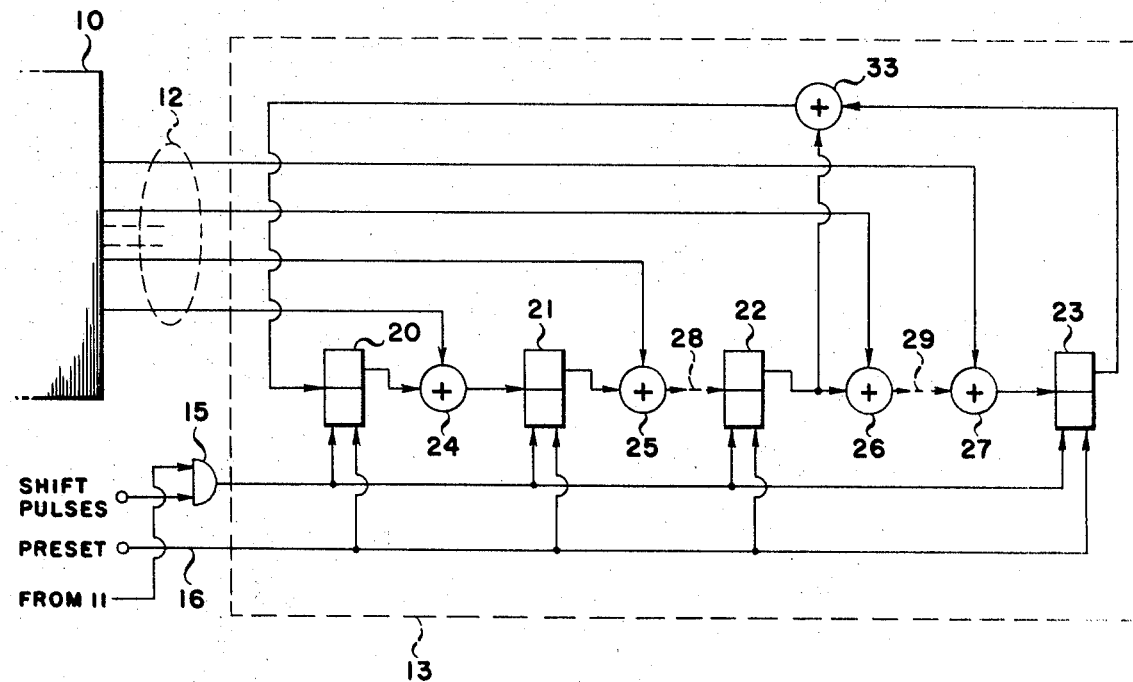

Other objects and advantages of the present invention will be readily apparent from the following detailed specification and drawing in which:

FIG. 1 shows a block diagram of a circuit test being conducted according to an embodiment of the present invention; and FIG. 2 shows in greater detail a schematic diagram of the embodiment of the fault detector depicted in FIG. 1.

Turning now to FIG. 1, there is shown an exemplary device 10 being tested according to an embodiment of the present invention. This device 10 could comprise, for example, a system or subsystem of digital circuitry designed to produce certain outputs in response to predetermined input signals. For the evaluation of the device 10, these input signals are supplied by an operational control unit 11 which may represent the actual source of input signals to the device 10 or which, in a typical testing or functional evaluation situation, may represent a source of signals particularly intended to simulate the modes of operation of the device 10.

The output or outputs of the device 10 being tested are connected as shown at 12 to the logic sequence circuit 13 in a manner described below. Shift pulses are provided from a suitable source through line 14 to the operational control unit 11 and to AND gate 15; another input to AND gate 15 is supplied from the operational control unit and is designated "start/stop." Preset signals are supplied by line 16 to the logic sequence circuit 13.

Turning now to FIG. 2 wherein the logic sequence circuit 13 of the disclosed embodiment is shown in greater detail, it can be seen that this circuit comprises a number N of memory elements such as flip-flops 20, 21, 22, and 23 of the kind frequently found in devices such as shift registers or the like. The output of each flip-flop except the Nth flip-flop 23 is connected to an input of corresponding exclusive OR gates 24, 25, 26, and 27, with omissions in the depiction of the N flip-flops and the corresponding N exclusive OR gates being indicated by dashed lines at 28 and 29. An additional exclusive OR gate 33 is provided to receive as inputs thereto the output of the Nth flip-flop 23 and the output of the $k$th flip-flop 22. The output of the exclusive OR gate 33 is fed back to the input of the first flip-flop 20 in the flip-flop chain. The exact designation of the $k$th flip-flop becomes important only where a register having the maximum length for a given number of memory elements without a repeating logical state is required; the selection of $k$ for this purpose is known to those skilled in the art of pseudorandom sequence generators, as represented, for example, in "Error-Correcting Codes" by W. Wesley Peterson, published 1961 by M.I.T. Press.

Each of the outputs of the device 10 being tested is individually connected to provide another input to each of the exclusive OR gates 24 through 27. An "exclusive OR gate," as the term is used herein, is a logic circuit in which each of two inputs can assume either a "zero" or a "one" state and in which the output assumes the "one" state if, and only if, a "one" is applied to either of the inputs to the gate while the remaining input has a "zero" applied. The logic sequence circuit 13 is completed by a shift connection from the output of the AND gate 15 to each of the N flip-flops whereby the states of these flip-flops can be shifted along the chain of flip-flops in a manner similar to a conventional shift register. The "preset" line also is connected to each of the flip-flops to permit these flip-flops to be preset to a predetermined known logical condition at the beginning of the evaluation procedure; the details of register shifting and setting are known to those skilled in the art and are not explained in greater detail here.

In understanding the operation of this technique, first consider the case where all of the output connections 12 are not connected or are connected and are at logical "zeros." If the shift registerlike arrangement of N flip-flops 20 through 23 is preset to a given number (excluding all "zeros"), that is to a given logical state, and shift pulses then are applied to the circuit 13, each shift pulse produces a new number in this circuit and the original preset number will not reappear until $2^N-1$ shift pulses have occurred. Moreover, since the outputs of the Nth flip-flop 23 and the kth flip-flop 22 are fed back through the exclusive OR gate 33 to the input of the first flip-flop 20, the sequence of the set of logical states or numbers appearing in the circuit will appear to be randomly distributed.

If a logical "one" signal is present at an input to one or more of the exclusive OR gates 24 through 27, as supplied from the output connections 12 of the device 10 being tested, it can be seen that the presence of this "one" at an input to the corresponding exclusive OR gate 24, for example, prevents a "one" output of the flip-flop 20 from reaching the input of the next flip-flop 21 in the flip-flop chain or implements a "one" input to the flip-flop 21 in the presence of a "zero" output of the flip-flop 20 when the next shift pulse is applied to the logic sequence circuit 13. This selective control of the circuit 13 by the exclusive OR gates 24 through 27 produces in that circuit a new number or logical state different from the number which would have been present if all of the output connections 12 exhibited "zeros." In effect, the presence at a particular one of the exclusive OR gates 24 through 27 of a logical "one" output from the device 10 causes the logic sequence circuit 13 to jump to a new position in a set of numbers which this circuit can assume. The magnitude of this jump is uniquely dependent upon the particular number in the circuit 13 at the time a given output from the device 10 being tested changes to a logical "one."

From the foregoing it can be seen that if a device 10 being tested is always operated in a consistent manner by the operational control 11 and is working properly, the logic sequence circuit 13 can be expected to arrive consistently at a certain logical state or number at the end of the operating sequence of the device 10, assuming that the circuit 13 is preset to the same starting number or logical state before each test sequence commences. Starting and stopping of the operation of the logic sequence 13 is correlated with the operation of the device 10 being tested through the provision of AND gate 15 as shown in FIG. 1. For a given device 10 that is known to be functioning properly, the logic sequence circuit 13 is connected to such a device and operated in the manner described to produce a certain final number in the circuit 13, whatever this number may be. This number then is noted, and subsequent tests of similar devices 10 will yield this identical number only if the time sequence of the outputs 12 of the similar devices is identical to the time sequence of the outputs of the device known to be functioning properly.

Since the logic sequence 13 is not programmed or otherwise specifically designed for use with a device 10 having particular circuitry or operational modes, it is apparent that the circuit 13 may be used to evaluate the performance of different types of devices 10 so long as the circuit 13 has an adequate number of inputs to accommodate the outputs 12 of the device being tested and so long as the particular unique final number of the circuit 13 indicating the desired operation of the particular class of device to be tested has been previously determined. Moreover, just as the proper mode of operation of a device 10 produces a certain final number in the circuit 13, particular types of malfunctions in the device being tested may produce a different unique final number in the circuit 13 so that the occurrence of this number indicates the presence of a particular type of malfunction. Further yet, it will be apparent to those skilled in the art that a modification of a particular device 10 resulting in a different time sequence of signals at the outputs 12 can readily be tested by the technique of this invention simply by determining a new final number for the modified device 10 known to be properly functioning and without making any changes to the circuit 13.

Although the disclosed embodiment refers to the testing of electrical circuits, it is obvious that the present invention is not limited to that specific field of use and can be used in conjunction with any other type of apparatus, such as pneumatic, mechanical, or the like which operates in a logical manner.

It should be understood of course that the foregoing relates only to a preferred embodiment of the invention and that numerous modifications or alterations may be made therein without departing from the spirit and the scope of the invention as set forth in the appended claims.

What I claim is:

1. The method of evaluating the performance of an apparatus, comprising the steps of:
    operating the apparatus according to a predetermined mode;
    establishing a system of logic which is selectively shiftable along a determinable sequence;
    shifting the system of logic along said determinable sequence of logic concurrently with the operation of such apparatus, the extent along said predetermined sequence of logic of each shift being controlled by the condition of at least one output of such apparatus so that the final logical condition of the system of logic is dependent upon the number of shifts along said determinable sequence and upon said condition of the apparatus output; and
    comparing said final logical condition to the final logical condition produced by the application of the foregoing steps to an apparatus of known performance characteristics.

2. The method of claim 10, further comprising the step of placing the sequence of logic in a predetermined logical condition prior to said step of operating the apparatus.

3. The method of evaluating the performance of an apparatus, comprising the steps of:
    obtaining from the apparatus a number of outputs the condition of which is dependent on the functioning of the apparatus;
    providing a system of logic capable of being shifted along a determinable sequence;
    applying the conditions present on the outputs of the apparatus being evaluated as inputs to locations in the system of logic whereat the determinable sequence is dependent on the output conditions when the system of logic is shifted;
    presetting the system of logic to a predetermined logical condition prior to the operation of the apparatus being evaluated;
    operating the apparatus to be evaluated according to a predetermined mode;
    shifting the system of logic concurrently with said step of operating the apparatus to enable the system of logic to reach a final logical condition dependent upon the number of shifts along said sequence and upon said conditions at the time of shifting; and
    comparing said final logical condition to the final logical condition produced by the application of the foregoing steps to an apparatus of known performance characteristics.

4. Apparatus for evaluating the performance of a logic device, comprising:
    a plurality of memory elements connected to form a logic register shiftable in a predictable sequence of logical states;
    said logic register having a shift pulse input and being responsive to a shift pulse applied thereto to undergo a shift of said memory elements to the next logic state in said predictable sequence of logic states;
    said logic register including logic control means connected to selectively control the nature of said predictable sequence of logic states in response to at least one output signal applied to said logic control means from the device being tested; and said logic control means being connected in said logic register to control the extent of said shift in response to the signal applied to said input.

5. Apparatus as in claim 4, further comprising feedback means connected in said register between the output of at least one of said memory elements and the input of another of said memory elements so that the logic state shifted out of said another element is fed back to provide an input to said one element.

6. Apparatus for evaluating the performance of a logic circuit, comprising:

a plurality of multiple state elements each having a signal input and a signal output, said elements being connected to form a register which is shiftable in a predictable sequence of logic states;

said register having a shift pulse input circuit responsive to a shift pulse applied thereto to cause the logical condition of the register to be shifted in said predictable sequence along the register in a direction from a first one of said elements to a final one of said elements so that the logical state of each of said elements excepting said final element can be shifted out of the element toward the next element in the direction of shift;

feedback circuit means extending from the signal output of at least said final element to the signal input of said first element to enable the logic state present in said final element to be shifted to said first element;

a plurality of logic control gates each having a first input, a second input, and an output;

the signal outputs of at least some of said elements excepting said final element being supplied to said first inputs of corresponding ones of said logic control gates and the output of each of said corresponding logic control gates being supplied to the signal input of the next one of said elements in said register; and said second inputs of said logic control gates being connectable to receive outputs from a logic circuit to be evaluated;

each of said logic control gates being operable upon receipt of a shift pulse by said register to present the next logic state in said predictable sequence to the signal input of the corresponding next one of said elements if a predetermined arrangement of signals is present at the first and second inputs to said gate and to present to such signal input a logic state in said predictable sequence other than said next state if said predetermined arrangement of signals is not present at the first and second inputs to said gates.

7. Apparatus as in claim 6, wherein:

said feedback circuit means includes a feedback control gate having a first input connected to receive logic state signals shifted out of said final element in the register and a second input connected to receive logic state signals shifted out of another of said elements;

said feedback control gate having an output connected to supply a certain logic state signal to the signal input of said first element if and only if a predetermined arrangement of signals is present at said first and second inputs of said feedback control gate.

8. Apparatus as in claim 6, wherein each of said logic control gates comprises an exclusive OR gate of the type which produces a certain logical output signal if an input signal is present at either of said inputs thereof and which does not produce said certain logical output signal if input signals occur simultaneously at both of said inputs thereof.